May 14, 1935. R. V. PROCTOR ET AL 2,001,315
CONDUIT
Filed Feb. 13, 1932 6 Sheets-Sheet 1
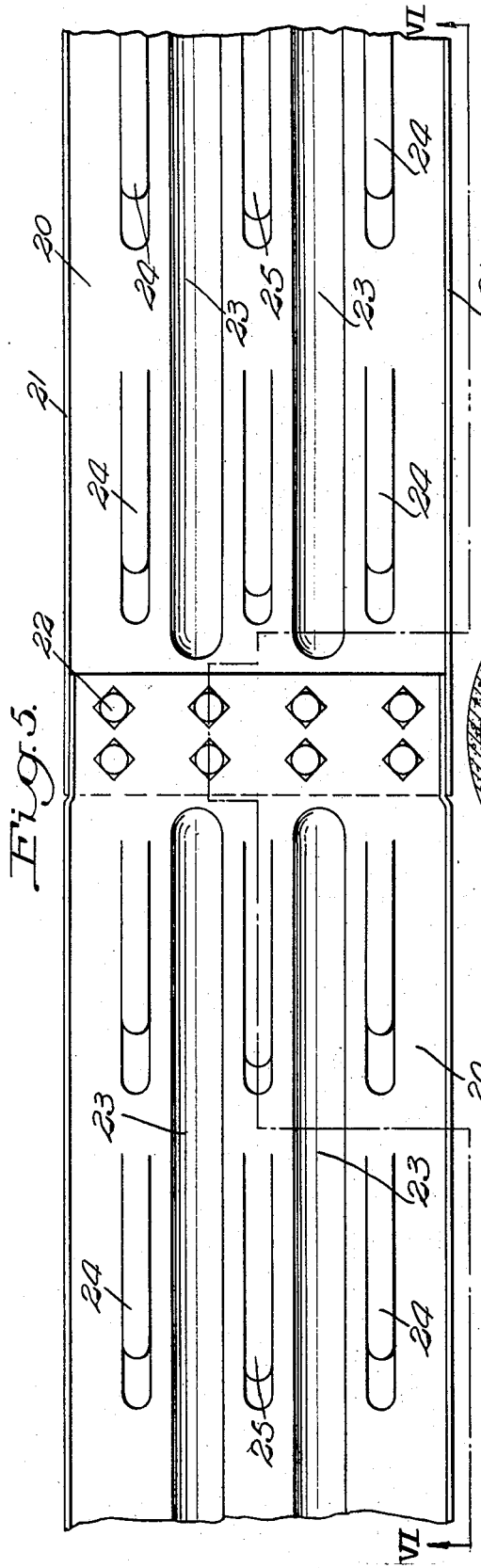
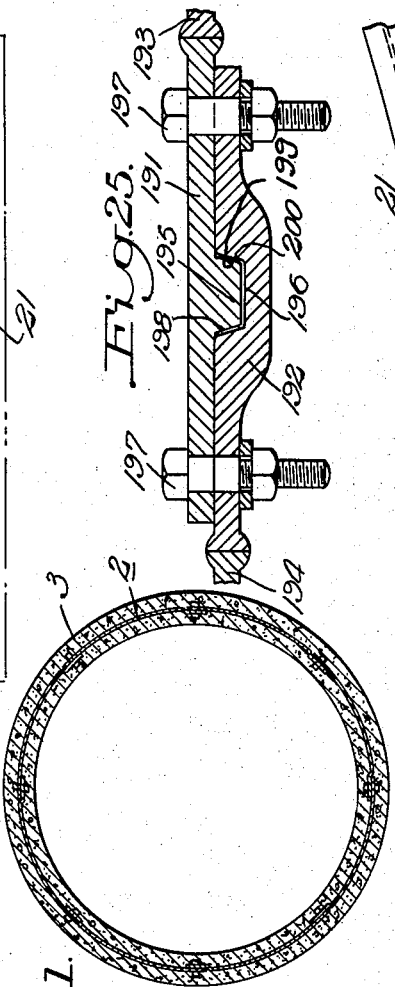
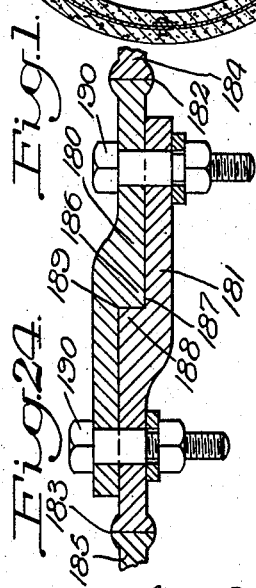
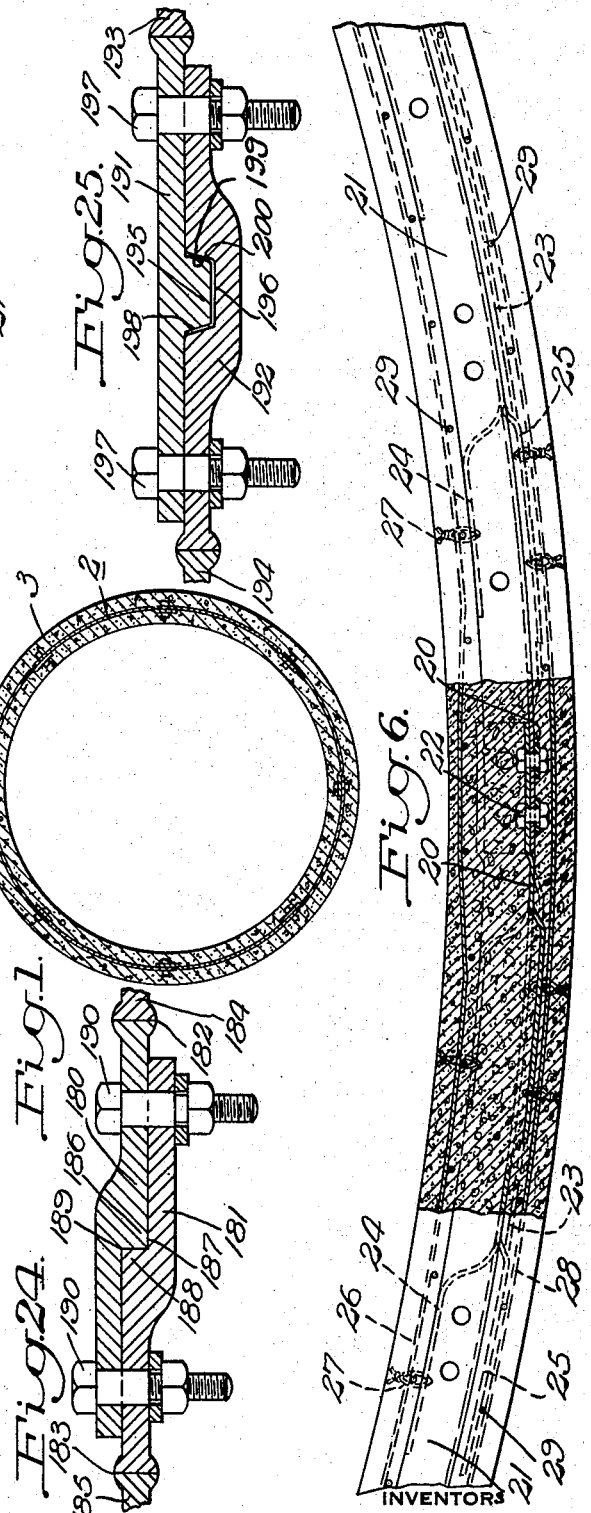

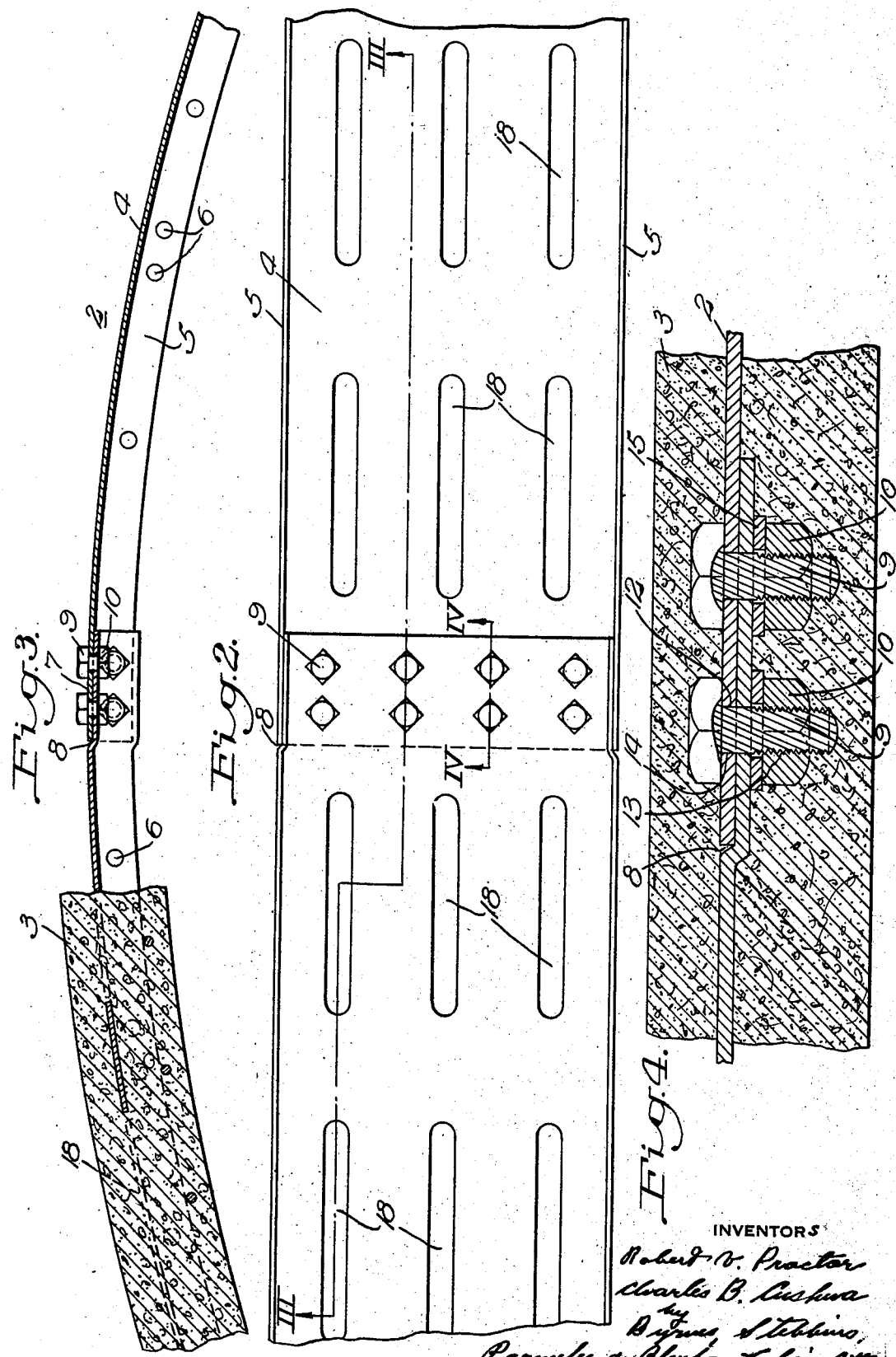

May 14, 1935.  R. V. PROCTOR ET AL  2,001,315
CONDUIT
Filed Feb. 13, 1932  6 Sheets-Sheet 3
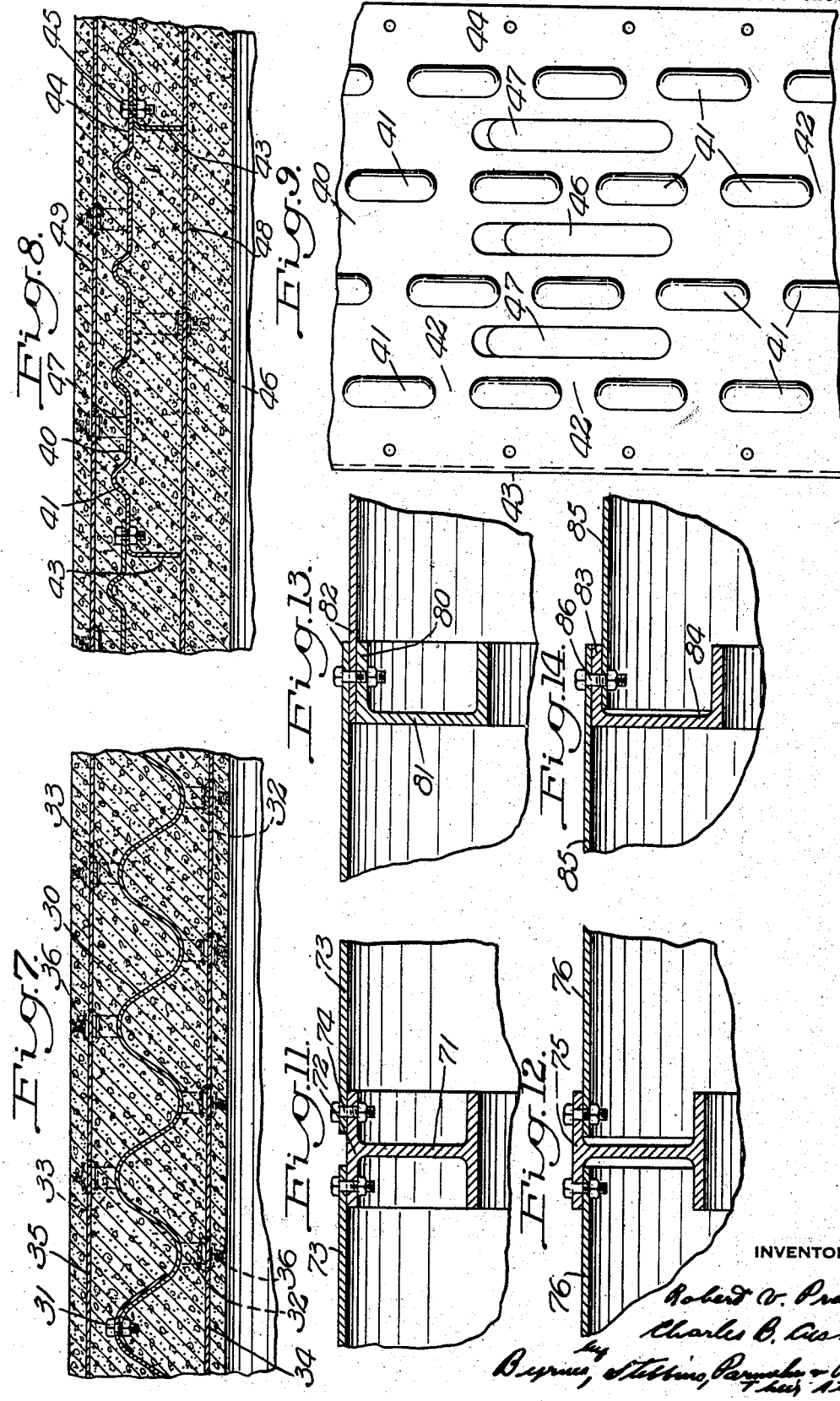

May 14, 1935.  R. V. PROCTOR ET AL  2,001,315
CONDUIT
Filed Feb. 13, 1932  6 Sheets-Sheet 4

INVENTORS
Robert V. Proctor
by Charles B. Aushwa
Byrnes, Stebbins, Parmelee & Blenko
Their Attys May 14, 1935.  R. V. PROCTOR ET AL  2,001,315
CONDUIT
Filed Feb. 13, 1932  6 Sheets-Sheet 5
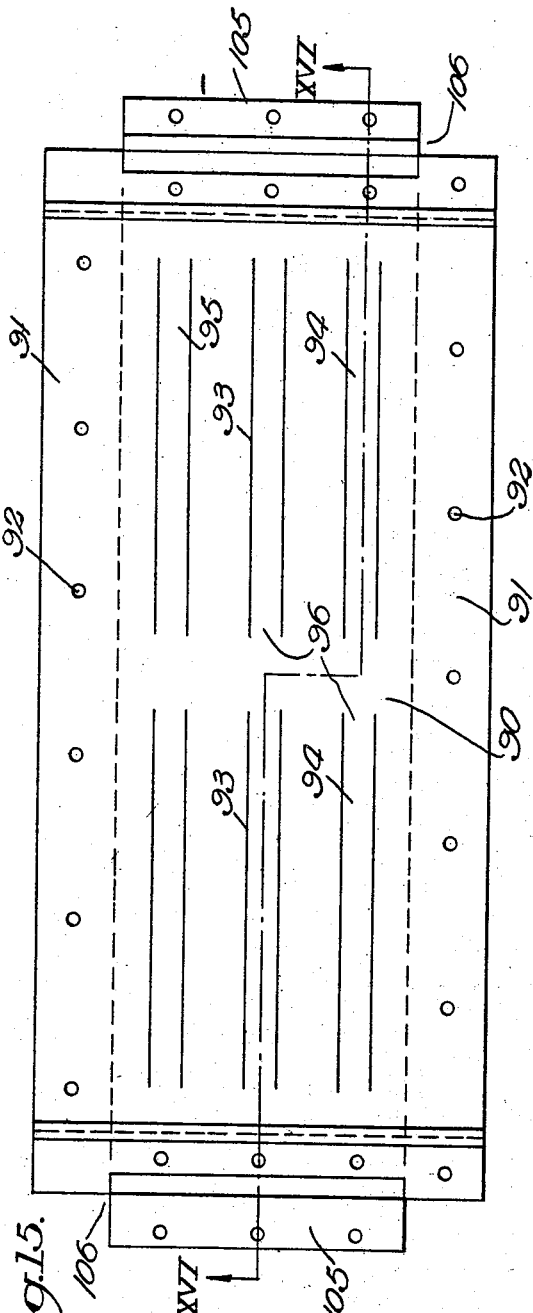
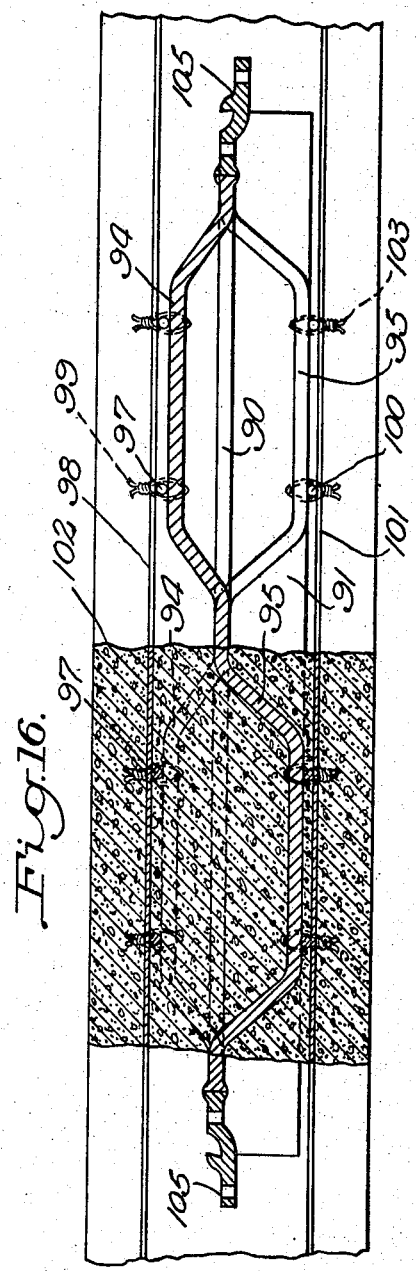
INVENTORS May 14, 1935. R. V. PROCTOR ET AL 2,001,315
CONDUIT
Filed Feb. 13, 1932 6 Sheets-Sheet 6
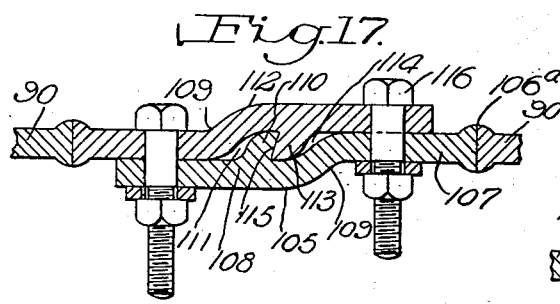
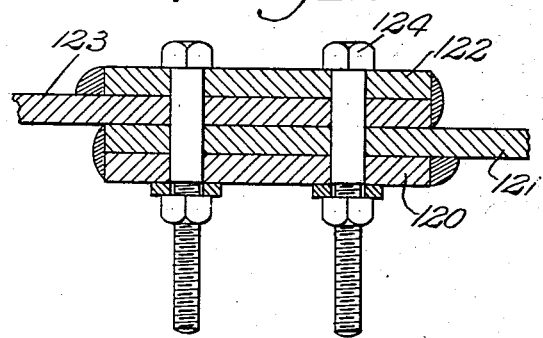
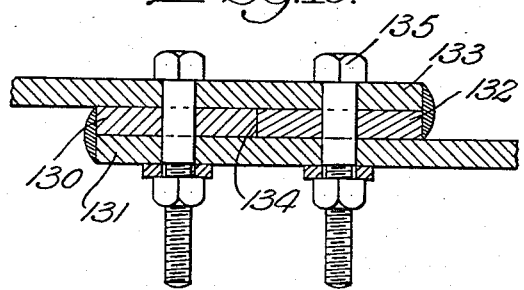
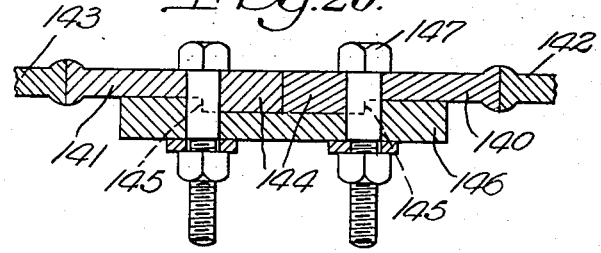
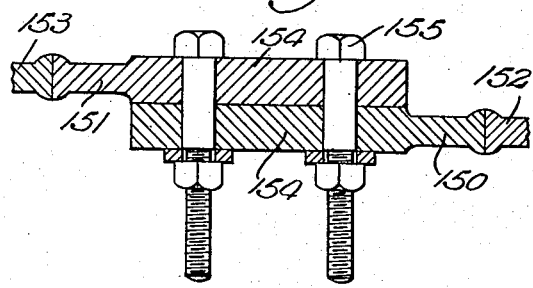
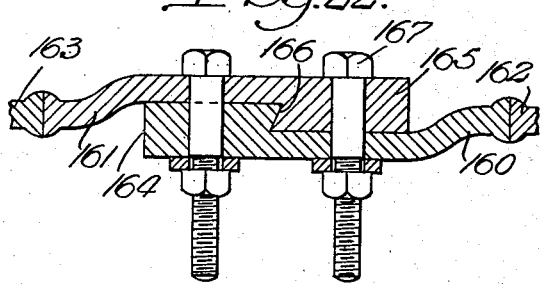
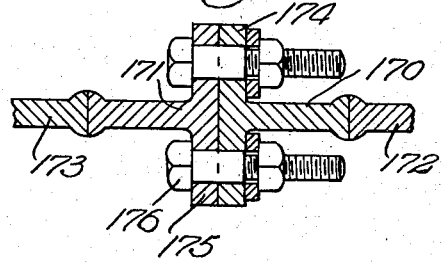
INVENTORS Patented May 14, 1935

2,001,315

UNITED STATES PATENT OFFICE 2,001,315

CONDUIT

Robert V. Proctor and Charles B. Cushwa, Youngstown, Ohio, assignors to The Commercial Shearing & Stamping Company, Youngstown, Ohio, a corporation of Ohio Application February 13, 1932, Serial No. 592,718

3 Claims. (Cl. 72—51)

This invention relates generally to conduits, and more particularly to conduits especially adapted for conveying water and which are subjected to internal pressure, although the invention is applicable to conduits which must withstand either internal or external pressure.

The conduit is formed from curved liner plates secured end to end to form a circumferential course, the adjacent courses also being connected to form the length of the conduit. The liner plates of each course are provided with cutout portions so that the cement which is sprayed against them will bond through the openings. The plates act as a target for the sprayed cement, remaining in the finished conduit and acting as reinforcement therefor.

In the accompanying drawings, which illustrate several embodiments of our invention, Figure 1 is a transverse section through the conduit, the view being shown on a much smaller scale than the other figures;

Figure 2 is a partial plan view of two liner plates illustrating the manner of connecting the ends thereof in order to withstand internal pressure;

Figure 3 is a sectional view taken on the line III—III of Figure 2, a portion of the lining being shown with cement applied thereto;

Figure 4 is an enlarged sectional view taken on the line IV—IV of Figure 2, also showing cement applied to the lining;

Figure 5 is a partial plan view similar to Figure 2 illustrating a modified form of liner plate;

Figure 6 is a partial section and partial side elevation of the lining shown in Figure 5 with cement applied to the lining;

Figure 7 is a partial longitudinal section through a completed conduit illustrating the use of corrugated sheets instead of liner plates.

Figure 8 is a view similar to Figure 7 illustrating a different form of liner plates;

Figure 9 is a partial plan view of the liner plates shown in Figure 8, the cement being eliminated;

Figures 11, 12, 13 and 14 are sectional details illustrating different types of circumferential reinforcing ribs;

Figure 15 is a plan view of a plate from which a modified type of liner plate is pressed, having bars welded to the ends thereof to increase the efficiency of the joint between the plates in a course;

Figure 16 is a section on the line XVI—XVI in Figure 15 after the side flanges have been formed, showing reinforcing means and cement applied to a portion of the liner plate; and Figures 17 to 25, inclusive, illustrate different types of joints between the plates making up a circumferential course.

Figure 10:
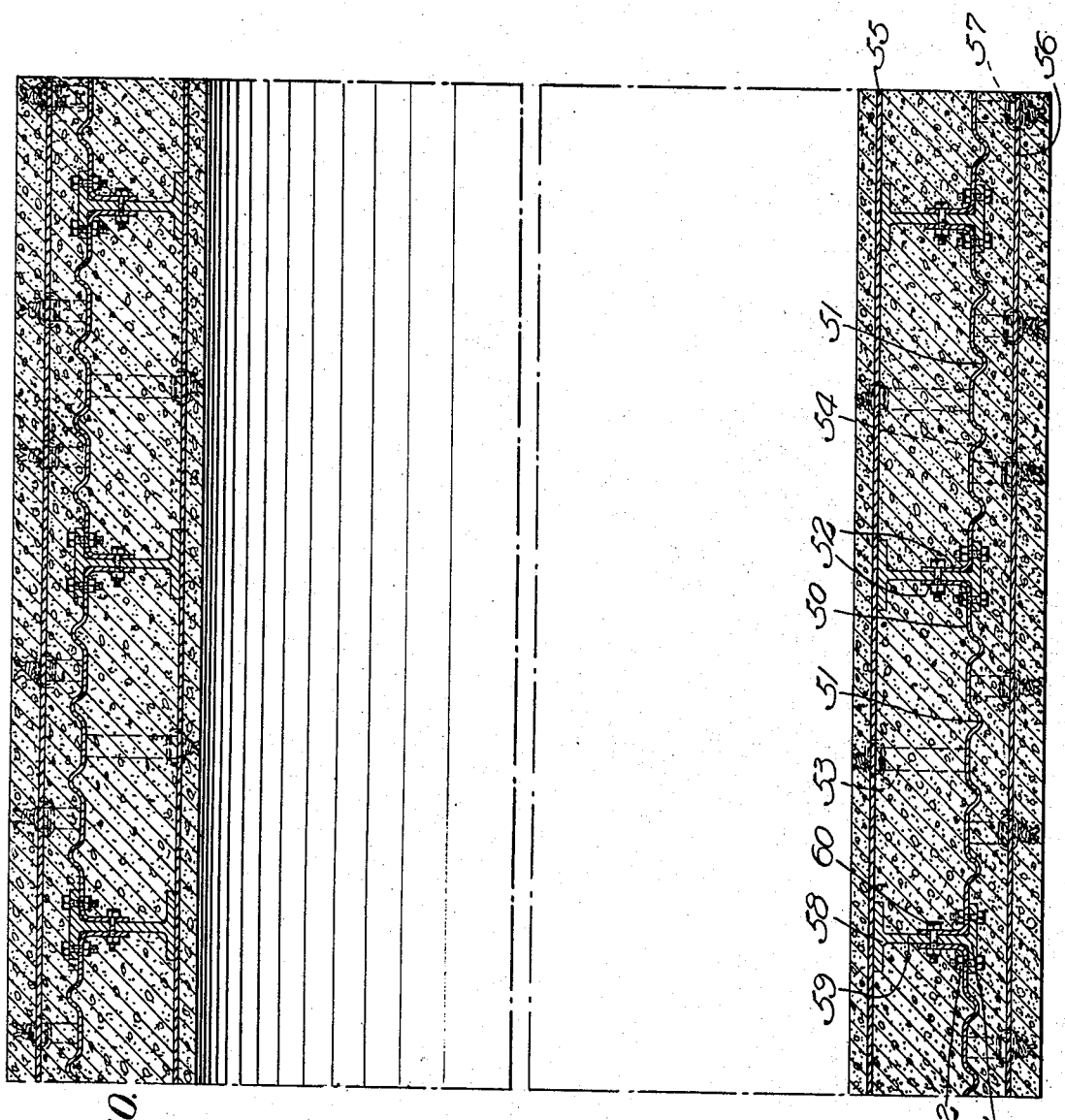
Figure 10 is a longitudinal section through a completed conduit illustrating circumferential reinforcing ribs between the different courses of liner plates.

Referring more particularly to Figures 1 to 4 of the drawings, the conduit comprises a plurality of liner plates 2 overlapped and secured at their ends to form a circumferential course of plates. These plates provide a target against and through which cement 3 is sprayed to cover the inside and outside of the lining.

The conduit of the present invention is particularly adapted for withstanding internal pressure such as it would be subjected to if used as a water conduit. The head of water which is sometimes quite large, exerts considerable internal pressure on the lining. The liner plates 2 used in forming the circumferential courses have a curved body 4 and side flanges 5. The side flanges are provided with holes 6 into which bolts may be inserted in order to connect the adjacent circumferential courses in order to complete the conduit. One end 7 of each liner plate is flat and fits into a recess or offset portion 8 formed in the opposite end of the adjacent plate. The overlapped ends 7 and 8 are secured by bolts 9 and nuts 10. The holes 12 into which the bolts fit are made slightly larger than the threaded portion 13 of the bolts, but are of the same size as the swelled-out portion 14 of the bolt shank. As the nuts 10 are screwed onto the bolts, the bolts are drawn down so that the swelled-out portion 14 of the bolt shank completely fills the opening in the liner plates, thereby eliminating any looseness in the joint and insuring that tension will be transmitted across the joint without substantial deformation of the liner. Washers 15 may be used between the nut and end of the plate. The plates are provided with cutouts 18 so that the cement will bond through.

In forming a conduit, the liner plates are overlapped at their ends and are secured to form a circumferential course of plates. Other circumferential courses of plates are secured to the first course by passing bolts through the openings 6 in the side flanges and securing them. Cement is applied by spraying it from a gun, using the liner plates as a target, the cement bonding through the openings 18 provided in the liner plates. No forms other than the plates themselves are needed in applying the cement. The plates, in addition to acting as a target for the sprayed cement, act as reinforcements and form an integral part of the finished conduit. Instead of spraying the cement, it may be applied by a trowel or other tool, although spraying is preferred.

In Figures 5 and 6, which illustrate another embodiment of the invention, liner plates 20 having side flanges 21 are secured together by means of bolts 22 in a manner similar to that already described. The plates have corrugations 23 extending longitudinally thereof and, therefore, circumferentially of the conduit. Instead of simply cutting out portions of the plates in order to allow the cement to bond therethrough, in this embodiment the cutout portions are bent to form lugs 24 and 25. The lugs 24 are bent inwardly, as shown in Figure 6, so as to extend substantially flush with the inner edge of the flange 21. The lugs 24 support expanded metal reinforcement 26 which extends circumferentially of the conduit, the expanded metal being secured to the lugs by wires 27. The lugs 25 are bent outwardly for a short distance to form a support for expanded metal reinforcement 28 which lies on the outside of the liner plates. Reinforcing rods 29 extend longitudinally of the conduit for taking longitudinal stresses and compensating for contraction and expansion due to changes in temperature. Fabricated metal such as expanded metal, or other reinforcement may be used in place of or in addition to the rods 29 if desired.

The cement is sprayed against the liner plates as a target as previously described to embed the liner plates and the various reinforcements therein.

In the construction illustrated in Figure 7, corrugated sheets 30 are used to form the lining in place of plates. These corrugated sheets are overlapped at their ends, as described in connection with the previous embodiments, to form a circumferential course. Adjacent courses are made by overlapping the sides of the sheets and securing the overlapped portions by means of bolts 31. The sheets are formed with cutouts which are bent inwardly or outwardly to form lugs 32 and 33 for supporting inner and outer expanded metal reinforcements 34 and 35 which are secured to the lugs by wires 36. Cement is applied as previously described after the corrugated sheets and reinforcing means have been assembled.

In the embodiment illustrated in Figures 8 and 9, the plates 40 have embossments 41 extending circumferentially of the conduit. These embossments, instead of extending continuously throughout substantially the whole length of a plate, are made much shorter than in the previous embodiments so as to provide flat spaces 42 between them to break up longitudinal stresses in the plates. The plates are bent at one side only to form a flange 43, the opposite side 44 being unflanged. The portion 44 is lapped over the flange 43 of an adjacent plate and secured thereto by bolts 45. The side overlap of the adjacent plates offers resistance to longitudinal as well as circumferential stresses. Lugs 46 and 47 are formed by bending cutout portions as previously described, the lugs acting as supports for expanded metal reinforcements 48 and 49 as previously described.

The plates 50 shown in Figure 10 are of the same general construction as those shown in Figures 5 and 6. They have corrugations 51 extending circumferentially of the conduit and are provided with side flanges 52. Portions of the plates are cut out and bent inwardly and outwardly to form lugs 53 and 54 which support expanded metal reinforcements 55 and 56, the reinforcements being secured to the lugs by wires 57.

Circumferential reinforcing ribs 58 are secured to the side flanges 52 of the plates which make up adjacent circumferential courses. In the form shown in Figure 10, the circumferential ribs are I-beams, the web 59 of which extends between and is connected to the side flanges 52 by bolts 60, while the head 61 extends outwardly beyond the plates and is secured thereto by bolts 62. Instead of using I-beams as the circumferential ribs, we may use ribs of any other suitable shape, for example T-irons, channels, angles, Z-bars or flat bars, and the plates may be connected either to the inner or outer flange of the ribs if flanged ribs are used.

In Figures 11, 12, 13 and 14, other circumferential reinforcing rib constructions are shown. The plates in these cases, instead of having side flanges, are flat. In Figure 11, an I-beam 71 is used as the circumferential rib. The flange 72 of the I-beam lies inside of the plates 73 and is secured thereto by bolts 74, while in Figure 12, the flange 75 lies outside of the plate 76.

Figures 13 and 14 illustrate the use of channels. The flange 80 of the channel 81 in Figure 13 lies inside of the two plates 82, while in Figure 14 the flange 83 of the channel 84 is inserted between the plates 85 and secured by bolts 86.

Referring to Figures 15 and 16, the plate 90 has side flanges 91 provided with bolt holes 92, the bolt holes in the opposite flanges being staggered so as to decrease the amount of metal cut out in any transverse section through the plate. The plate is slit longitudinally as indicated by the reference numeral 93 and the slit portions of the plate are bent to form loops 94 and 95 shown in Figure 16. This construction of the loops is somewhat similar to the lugs 24 and 25 shown in Figures 5 and 6, except that instead of cutting one end of the slit portion so as to provide a free end as shown in Figures 5 and 6, in the present embodiment longitudinal slits 93 only are formed, and the loops 94 and 95 remain connected at each end 96 to the body of the plate. The loops 94 are bent toward the outside of the plate and act as supports for reinforcing rods 97 extending longitudinally of the conduit, and also support expanded metal reinforcements 98 which are tied to the rods 97 and the loops 94 by wires 99. The alternate loops 95 are bent toward the inside of the conduit and reinforcing rods 100 and expanded metal reinforcements 101 are secured thereto by wires 103. The loops and reinforcements act to bond the cement 102 which is forcibly impacted against the plate. The loop construction shown in this embodiment can be used in place of the lugs 24 and 25 in any of the embodiments of our invention.

The efficiency of the joint between the ends of the plates is increased by welding a bar 105 to each end of the plate 90. These end bars 105 preferably are notched at their outer corners as indicated by the reference numeral 106. These notches act as locating points in pressing the plates, preventing them from sliding sideways in the dies. Furthermore, since portions of the end bars are made thicker than the body of the plates in order to increase the efficiency of the joints, it would be more difficult to bend these thickened sections into side flanges.

The preferred form of joint where end bars 105 are welded to the ends of the liner plates is shown in Figure 17. The end bars 105 are butt welded to the plates 90 along the line 106a. The bar 105 has a portion 107 lying substantially flush with the plate 90 and a portion 108 lying in a lower plane than the plate 90 and connected to the portion 107 by a curved or offset portion 109. The bar 105 has a projection 110 fitting in a corresponding recess 111 formed in a bar 112 which is butt welded to the left-hand plate 90. The bar 112 also has a projection 113 fitting in a recess 114 formed in the bar 105. The projections 110 and 113 contact along a line 115 which forms a reentrant angle extending at an angle of about 5° to the plates 105 and 112. The projections 110 and 113 are prevented from becoming disengaged when the conduit is subjected to internal pressure, by bolts 116. These bolts preferably have swelled-out shanks, as previously described, in order to fill the bolt holes when they are drawn into position by the nuts and force the projections into initial contact. It will be noted that in this joint the contacting surfaces of the projections 110 and 113 lie in the plane of the plates 90 and that each of the plates lies in the same plane. This eliminates any moment couple that would be present if the plates were in different planes, which moment couple has a tendency to shear the bolts. Most of the tension in this joint is taken by the contact of the lugs 110 and 113 so that the number of bolts and bolt holes may be decreased, the principal function of the bolts being to prevent the lugs from becoming disengaged rather than to withstand the tension of the joint. The end bars 105 are thicker than the liner plates by an amount sufficient to compensate for the metal removed in the notches and bolt holes in the joint, thus maintaining the full strength of the liner even at the joints.

In the joint illustrated in Figure 18, a plate 120 is welded to the end of liner plate 121, and a similar plate 122 is welded to the other liner plate 123. The plates 120 and 122 increase the section of the joint through the bolt holes and provide increased bearing surfaces for the bolts 124 which connect the ends of the liner plates.

In Figure 19, a plate 130 is welded to the end of liner plate 131, and a plate 132 is welded to the liner plate 133. The plates 130 and 132 engage along a line 134, these plates 130 and 132 taking most of the tension in the joint, as is the case in the embodiment shown in Figure 17. Bolts 135, which extend through the plates 130 and 132 as well as the ends of the liner plates, are provided in order to prevent the plates 130 and 132 from becoming disengaged when the conduit is subjected to internal pressure.

In the embodiment shown in Figure 20, plates 140 and 141 are butt welded to the ends of liner plates 142 and 143. The outer end of each of the plates 140 and 141 is thickened to form a stepped portion 144. The surfaces 145 are engaged by a clamping member 146 which is secured to the end plates 140 and 141 by bolts 147.

In the joint shown in Figure 21, bars 150 and 151 are welded to the ends of plates 152 and 153. The outer ends 154 of each of the bars 150 and 151 are thickened so as to increase the bearing surface of the bolts 155 which secure the bars together.

In the joint shown in Figure 22, end bars 160 and 161 are welded to the ends of liner plates 162 and 163. The bar 160 is curved downwardly from the plane of the plate 162 and the outer end of the bar is thickened to form an offset portion 164. The bar 161 is curved upwardly from the plane of the plate 163 and its outer end is thickened and formed in an offset 165, the two offsets 164 and 165 engaging along a line 166. The bars 160 and 161 are secured by bolts 167. In this joint also, the moment couple is eliminated since the line of contact 166 lies in the plane of the plates 162 and 163.

In the embodiment shown in Figure 23, T-bars 170 and 171 are welded to liner plates 172 and 173. The flanges 174 and 175 are secured by bolts 176.

Some of the joints illustrated in Figures 17 to 23, inclusive, for example the joint shown in Figure 22, are designed particularly to withstand internal pressure in the conduit. When the conduit is subjected to internal pressure, the offset ends 164 and 165 engage along the line 166, transmitting the tension through the joint.

In some cases, however, it is desired to form a joint adapted to withstand the external pressure such as it would be subjected to if the liner were employed in large culverts and the pressure would be exerted from the outside of the conduit. Such a joint is illustrated in Figure 24. Bars 180 and 181 are butt welded along the edges 182 and 183 to the ends of liner plates 184 and 185. The bar 180 has a projection 186 fitting into a recess 187 in the bar 181, and the bar 181 has a projection 188 fitting into a recess 189 in the bar 180. The bars 180 and 181 are maintained in engagement with each other by bolts 190. This type of joint is similar to the construction illustrated in Figure 22, except that the parts have been reversed, and it will be seen that whereas in Figure 22 the joint is adapted to withstand internal pressure, in Figure 24 it is adapted to withstand external pressure. In the joint of Figure 24, when the conduit is subjected to external pressure, the adjacent edges of projections 186 and 188 will engage to withstand the compression.

When the liner is employed for certain purposes, it is necessary that the joint withstand external pressure during one part of the construction of the conduit, and to withstand internal pressure after the conduit has been completed. Thus, in the case where the conduit is to be buried in a deep trench, cement is sprayed on the outside of the liner and the trench is back-filled. At this stage of the construction, the liner and joint are subjected to external pressure. The conduit is then completed by spraying cement from the inside of the conduit. When water is turned into the conduit, the liner and joint must withstand the internal hydraulic pressure. A joint adapted for such conditions is illustrated in Figure 25, in which bars 191 and 192 are butt welded to the ends of liner plates 193 and 194. The bar 191 has a tongue 195 which fits into a groove 196 in the bar 192. The bars are maintained in engagement with each other by bolts 197. When the conduit is subjected to external pressure, the ends of liner plates 193 and 194 will be forced toward each other and the tongue 195 will engage with the recess 196 along the edge 198. When the conduit has been completed and it is subjected to internal hydraulic pressure, the ends of the liner plates will tend to be drawn apart, but will be resisted due to contact between the edge 199 of the tongue and the wall 200 of the groove 196. Thus, it will be seen that the joint illustrated in Figure 25 is adapted to withstand either internal or external pressure.

A conduit constructed in accordance with the present invention may be easily assembled since the plates are relatively small and have a relatively light weight, as compared with sections of pipe which have been used heretofore for making conduits for carrying water. The plates, corrugated sheets or other liner employed according to the present invention acts not only as a target against which the cement is sprayed, but also forms a permanent part of the conduit, reinforcing it and preventing it from deforming substantially when subjected to either internal or external pressure. The conduit is made water tight by the application of cement to the liner plates. The cement is prevented from checking or cracking by the reinforcing means described. The forms of joints shown, in combination with the bolts having swelled-out shanks, insure that there will be tight joints between the ends of the liner plates which will transmit tension without the conduit deforming.

In any of the embodiments, the plates may be either corrugated or plain. The cement may be caused to bond to the plates either by cutting out openings in the plates, as shown in Figure 2, by slitting the body of the plate and forming lugs with free ends, as illustrated in Figure 6, or by slitting the plate and forming loops, as indicated in Figures 15 and 16. Another arrangement which may be used is to slit the liner plate, form other slits at the ends of the first slit and at on angle thereto, and bend the slit portion either outwardly or inwardly to act as supports for reinforcing material and space it away from the body of the plates. The plates may or may not have side flanges and may be pressed or rolled to form the desired shape. Thus, channels or I-beams could be rolled to form the liner plates, although it is preferred to form the plates by a pressing operation.

We have illustrated and described several embodiments of our invention. It is to be understood, however, that the invention is not limited to the forms shown, but may be otherwise embodied within the scope of the following claims.

We claim:

1. In a conduit, a liner comprising a plurality of liner plates connected to form a circumferential course, each of the plates having a flange on one side only, the body of each plate being provided with spaced local staggered embossments extending circumferentially of the conduit and leaving flat metal between adjacent embossments for withstanding longitudinal stresses in the liner, means for connecting the plates along their sides to adjacent circumferential courses, said liner acting as a target for cement sprayed against it, portions of the plates being cut and bent into lugs extending in a different plane than the body portions of the plates.

2. In a conduit, a liner comprising a plurality of liner plates connected to form a circumferential course, the body of each plate being provided with spaced local staggered embossments extending circumferentially of the conduit all of the metal between adjacent embossments in the same circumferential line being flat for withstanding longitudinal tension stresses in the liner, and means for connecting the plates along their sides to adjacent circumferential courses.

3. In a conduit, a liner comprising a plurality of liner plates connected to form a circumferential course, each of the plates having a flange on one side only, the body of each plate being provided with spaced local staggered embossments extending circumferentially of the conduit and leaving flat metal between adjacent embossments for withstanding longitudinal stresses in the liner, and means for connecting the plates along their sides to adjacent circumferential courses.

ROBERT V. PROCTOR.
CHARLES B. CUSHWA.